US006816075B2

(12) United States Patent
Grunes et al.

(10) Patent No.: US 6,816,075 B2
(45) Date of Patent: Nov. 9, 2004

(54) EVIDENCE AND PROPERTY TRACKING FOR LAW ENFORCEMENT

(75) Inventors: Mitchell B. Grunes, Minneapolis, MN (US); Gerald L. Karel, Maplewood, MN (US); Peter L. Olson, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/789,903

(22) Filed: Feb. 21, 2001

(65) Prior Publication Data

US 2002/0113707 A1 Aug. 22, 2002

(51) Int. Cl.[7] ................................................ g08b 13/14
(52) U.S. Cl. .............................. 340/572.1; 340/572.8; 340/539.1; 340/825.54; 340/10.1; 340/568; 700/214; 700/215; 700/219; 700/224; 700/225; 700/226; 235/275; 235/385; 235/427; 235/425; 235/435; 235/492
(58) Field of Search ........................... 340/572.1, 572.8, 340/539.1, 825.54, 10.1, 568; 700/214, 215, 219, 224, 225, 226; 235/275, 385, 429, 425, 435, 492

(56) References Cited

U.S. PATENT DOCUMENTS

| 4,636,634 A | 1/1987 | Harper et al. ................ 250/223 |
| 4,636,950 A | 1/1987 | Caswell et al. ............. 364/403 |
| 4,676,343 A | 6/1987 | Humble et al. ................ 186/61 |

(List continued on next page.)

FOREIGN PATENT DOCUMENTS

| EP | 0 740 262 A2 | 10/1996 | ............ G06K/7/10 |
| EP | 0 794 507 A2 | 9/1997 | .......... G06K/17/00 |
| GB | 2 308 947 | 7/1997 | ............ G06K/7/10 |
| WO | WO 98/13800 | 4/1998 | .......... G08B/13/14 |
| WO | WO 98/16849 | 4/1998 | |
| WO | WO 98/27670 | 6/1998 | ............ H04B/7/08 |
| WO | WO 99/05660 | 2/1999 | .......... G08B/13/14 |
| WO | WO 99/65006 | 12/1999 | .......... G08B/17/00 |
| WO | WO 00/10112 | 2/2000 | ............ G06K/7/00 |
| WO | WO 00/10122 | 2/2000 | ............ G06K/1/18 |
| WO | WO 00/10144 | 2/2000 | .......... G08B/13/24 |
| WO | WO 00/16280 | 3/2000 | .......... G08B/13/14 |
| WO | WO 01/52179 | 7/2001 | ............ G06K/9/00 |
| WO | WO 01/57807 | 8/2001 | ............ G07C/9/00 |

OTHER PUBLICATIONS

Derwent Abstract for DE 19844631.
Derwent Abstract for JP 2000306188.
Derwent Abstract for WO 9858238.
HID Corporation Press Release entitled IBM® Introduces Notebook PCs with HID's Proxtrak™ Technology (2 pgs.) dated Feb. 15, 2001.
Information Brief: Asset ID of IBM dated May 2000 (6 pgs.).
Web article from AXCESS Inc. Products entitled: Wireless Automatic ID: Overview (4 pgs.) dated Feb. 15, 2001.
Article from web of IDSystems entitled "RFID: What's It Worth to You?" (6 pgs.) dated Sep. 1999 (printed Feb. 15, 2001).
Web article from Porter Lee Corporation entitled "Crime Fighter Beast—Police Evidence Tracking System "(3 pgs.) printed Dec. 10, 2001.

(List continued on next page.)

Primary Examiner—Daniel J. Wu
Assistant Examiner—Tai T. Nguyen
(74) Attorney, Agent, or Firm—Melissa E. Buss

(57) ABSTRACT

Methods and systems for collecting, tagging, searching for, retrieving, inventorying, and transferring evidence by law enforcement officials are described, in which RFID tags associated with pieces of evidence can be interrogated to assist in locating information relating to that evidence.

14 Claims, 2 Drawing Sheets

U.S. PATENT DOCUMENTS

| | | | |
|---|---|---|---|
| 4,688,026 A | 8/1987 | Scribner et al. | 340/572 |
| 4,835,372 A | 5/1989 | Gombrich et al. | 235/375 |
| 4,862,160 A | 8/1989 | Ekchian et al. | 340/825 |
| 4,924,219 A | 5/1990 | Sato | 340/825 |
| 5,063,380 A | 11/1991 | Wakura | 340/825 |
| 5,151,684 A | 9/1992 | Johnsen | 340/572 |
| 5,231,273 A | 7/1993 | Caswell et al. | |
| 5,288,980 A | 2/1994 | Patel et al. | 235/381 |
| 5,334,822 A | 8/1994 | Sanford | 235/385 |
| 5,406,263 A | 4/1995 | Tuttle | 340/572 |
| 5,432,864 A | 7/1995 | Lu et al. | 340/825 |
| 5,434,775 A | 7/1995 | Sims et al. | 364/403 |
| 5,448,220 A | 9/1995 | Levy | 340/539 |
| 5,450,070 A | 9/1995 | Massar et al. | 340/825 |
| 5,461,390 A | 10/1995 | Hoshen | 342/419 |
| 5,537,105 A | 7/1996 | Marsh et al. | 340/825 |
| 5,541,585 A | 7/1996 | Duhame et al. | 340/825 |
| 5,589,820 A | 12/1996 | Robinson et al. | 340/572 |
| 5,610,596 A | 3/1997 | Petitclerc | 340/825 |
| 5,635,693 A | 6/1997 | Benson et al. | 235/384 |
| 5,635,917 A | 6/1997 | Todman | 340/825 |
| 5,640,002 A | 6/1997 | Ruppert et al. | 235/472 |
| 5,682,142 A | 10/1997 | Loosmore et al. | 340/572 |
| 5,689,238 A | 11/1997 | Cannon, Jr. et al. | 340/568 |
| 5,708,423 A | 1/1998 | Ghaffari et al. | 340/825 |
| 5,739,765 A | 4/1998 | Stanfield et al. | 340/825 |
| 5,745,036 A | 4/1998 | Clare | 340/572 |
| 5,751,221 A | 5/1998 | Stanfield et al. | 340/825 |
| 5,786,764 A | 7/1998 | Engellenner | 340/572 |
| 5,804,810 A | 9/1998 | Woolley et al. | 235/492 |
| 5,936,527 A | 8/1999 | Isaacman et al. | 340/572 |
| 5,938,727 A * | 8/1999 | Ikeda | 709/218 |
| 5,955,951 A * | 9/1999 | Wischerop et al. | 340/572.8 |
| 5,963,134 A | 10/1999 | Bowers et al. | 340/572 |
| 5,995,017 A | 11/1999 | Marsh et al. | 340/825 |
| 6,002,344 A | 12/1999 | Bandy et al. | 340/825 |
| 6,032,127 A | 2/2000 | Schkolnick et al. | 705/23 |
| 6,057,756 A | 5/2000 | Engellenner | 340/505 |
| 6,079,890 A * | 6/2000 | Gross et al. | 400/636 |
| 6,100,804 A | 8/2000 | Brady et al. | 340/572 |
| 6,127,928 A | 10/2000 | Issacman et al. | 340/572 |
| 6,137,411 A | 10/2000 | Tyren | 340/572 |
| 6,150,921 A | 11/2000 | Werb et al. | 340/10.1 |
| 6,154,137 A | 11/2000 | Goff et al. | 340/572.4 |
| D435,557 S | 12/2000 | Eisenberg et al. | D14/428 |
| 6,195,006 B1 | 2/2001 | Bowers et al. | 340/572.1 |
| 6,232,870 B1 | 5/2001 | Garber et al. | 340/10.1 |
| 6,260,049 B1 * | 7/2001 | Fitzgerald et al. | 707/104.1 |

OTHER PUBLICATIONS

Web article from Porter Lee Corporation entitled "Crime Fighter Beast—LIMS Laboratory Information Management System" (3 pgs.) printed Dec. 10, 2001.

"VTLS RFID Solution" from VTLS Inc. Web site (2 pgs.) dated Sep. 13, 2001.

Herdeen, Frederick et al., "Get a lock on inventory"; Security Management; Arlington; Oct. 1996 (6 pgs.).

Finkenzeller, Klaus; "RFID Handbook—Radio–Frequency Identification Fundamentals and Applications" Chapter 13—Example Applications; (pp. 227–273) 1999.

* cited by examiner

EVIDENCE AND PROPERTY TRACKING FOR LAW ENFORCEMENT

TECHNICAL FIELD

The present invention relates to evidence and property tracking systems and methods for use particularly in law enforcement.

BACKGROUND OF THE INVENTION

Police, jails, prisons and other government authorities typically collect evidence and property, such as weapons, clothing, money, drugs, and documents, for use in subsequent investigations and legal proceedings, or simply to hold while a person is detained. That evidence and property must be secured against unintentional or intentional tampering, theft, substitution or loss to preserve its value in those investigations and proceedings. For example, if a critical piece of evidence is lost, or if a witness at a trial cannot positively identify the evidence and the chain of custody from the time and place where it was collected to the time and place where it was authenticated, then a suspect who committed a crime may be allowed to go free. This is undesirable for several obvious reasons.

Current evidence collection and storage may be done in several different ways, but what follows is one example. An officer or investigator may retrieve a piece of evidence at a certain location, and then place that evidence into a bag or envelope. After the person seals the bag or envelope, she may write certain information on it, or on a paper or other record associated with it, to enable the evidence to be positively identified at a later time. That information may include the case number (if known), the type of crime, the victim's name or names, the suspect's name or names, the location where the evidence was retrieved, and other identifying information. The officer or investigator may also sign the bag, envelope, paper or record or make some other unique mark, to enable her to positively identify the evidence later. In the collection of property from a suspect prior to incarceration, for example, the property may be similarly bagged and tagged.

Once the evidence or property has been collected, it is brought to a central storage location, such as an evidence room or a file room. There it may be checked in, and the person receiving the evidence may indicate on the bag or envelope that the officer no longer possesses the evidence, but that it is in the possession of the evidence room. This is a transfer of custody; a part of (or link in) the chain of custody required to be proven in many later proceedings at which a party seeks to introduce the evidence. Within the evidence room, the evidence may be stored in a file, envelope, box or other container, or simply on a shelf Whenever the evidence is subsequently removed from its location, the person removing it is supposed to make a new entry on the bag, envelope, paper, or record indicating that that person now possesses the evidence. When the evidence is needed for a trial or other proceeding, the evidence can then be checked out to a person who can bring it along for use in that proceeding.

This and other similar systems of evidence management can suffer from a number of problems, not the least of which is that the system for tracking the chain of custody relies to a great degree on people being willing and able to accurately document possession. It can also be difficult to locate evidence within an evidence room, particularly where, for example, one piece of evidence (such as a handgun) is stored with a large group of items that have a similar appearance. In view of these and other difficulties, it is desirable to provide a better evidence management system than has been used until now.

BRIEF DESCRIPTION OF THE DRAWING

Certain embodiments of the present invention are illustrated in FIG. 1, which is a schematic illustration of a conversion station.

SUMMARY OF THE INVENTION

Figure 1:
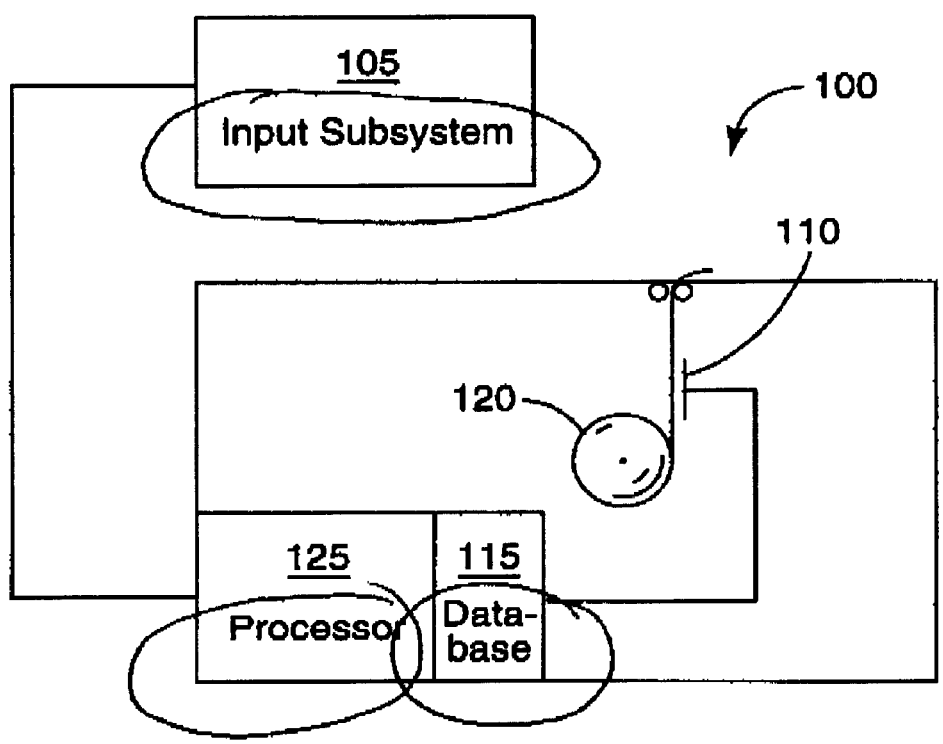

The present invention has several aspects related to the use of RFID technology in obtaining, tagging, searching for, and otherwise handling evidence and property. As described in more detail below,

DETAILED DESCRIPTION OF THE INVENTION

The present invention includes not only the recognition of certain problems that have long plagued the storage, retrieval and tracking of evidence, but also the application of radio frequency identification, or "RFID" technology to that field in the manner described herein. Before describing the applications, methods, systems, and components of the present invention, a short overview of RFID technology will be provided.

I. RFID Technology

RFID tags have been in use for some time to tag objects such as library books. The RFID tag typically includes an antenna and an integrated circuit operatively connected to the antenna. For some applications, battery powered RFID tags (sometimes referred to as "active" tags) are preferred, and for other applications, unpowered (or "passive" tags) are preferred. These tags are described in various patents and publications, and are currently sold by companies including Texas Instruments of Dallas, Tex. (under the designation "TAG-ITTM"), Philips Semiconductors of Eindhoven, Netherlands (under the designation I-CODETM), and Intermec Technologies Corporation of Everett, Wash. (under the designation INTELLITAGTM).

Another component of an RFID system is a reader or interrogator. The RFID reader may be portable (and even hand-held) or stationery, and it includes an antenna and associated reader/writer hardware and software, a power source, a processor (typically including a database or memory), a user interface, and software for running the applications of the kind described herein. One RFID reader is sold by Texas Instruments of Dallas, Tex. under the designation Commander 320. The RFID reader, when activated, transmits signals at a predetermined frequency (such as 13.56 megahertz), which can then activate tags within the interrogation range of the reader. The RFID tags respond by modulating the signals that they each receive, and the reader receives the modulated signals back from the tags. The interchange of data through these signals enables the RFID reader to obtain information from the RFID tags. RFID readers that are compatible with the RFID tags described above are available from ID Systems Inc. of Manchester, U.K. (under the designation HANDSPRING and MRR (mid-range reader), BALTECH AG, of Hallbergmoos, Germany (under the designation ID-ENGINE), and Feig Electronics GmbH of Weilburg-Waldhausen, Germany (under the designation OBID I-SCAN). Most conventional RFID readers also have a programming or "writing" capability, and thus combine both reading and writing (interrogation and programming) into a single device. For applications where either or both functions are required, combination reader/writers or separate readers and writers may be used.

A processor that is part of the RFID reader, or a processor or database to which the reader can be linked, may contain information correlating the interrogated RFID tag to the item to which the tag is attached. Thus, if the RFID tag is attached to a library book, the reader may obtain a tag identification number from the tag, match it to the same number in its own or another database, and then be able to determine information about the item.

Although they form parts of the same inventive concepts related to specific uses of RFID technology for criminal evidence, portions of the invention will be separately described below for the convenience of the reader. Also, references to evidence may include property held by law enforcement authorities or the like for non-evidentiary purposes, such as while a suspect is incarcerated.

II. RFID for Criminal Evidence and Property

A. Conversion. One aspect of the present invention involves the conversion of existing tagged evidence collections to an RFID-tagged evidence collection. Existing tagging systems may include printed bar-code tags, stickers, paper labels, or other similar things that are attached either directly to the piece of evidence, or to the container in which the evidence is stored. In this aspect of the present invention, a conversion station and method is provided for converting the existing tagged evidence to RFID-tagged evidence. One such system is described in the context of library materials in PCT Publication WO 00/10122(Garber et al.), which is assigned to the assignee of the present invention.

Figure 2:
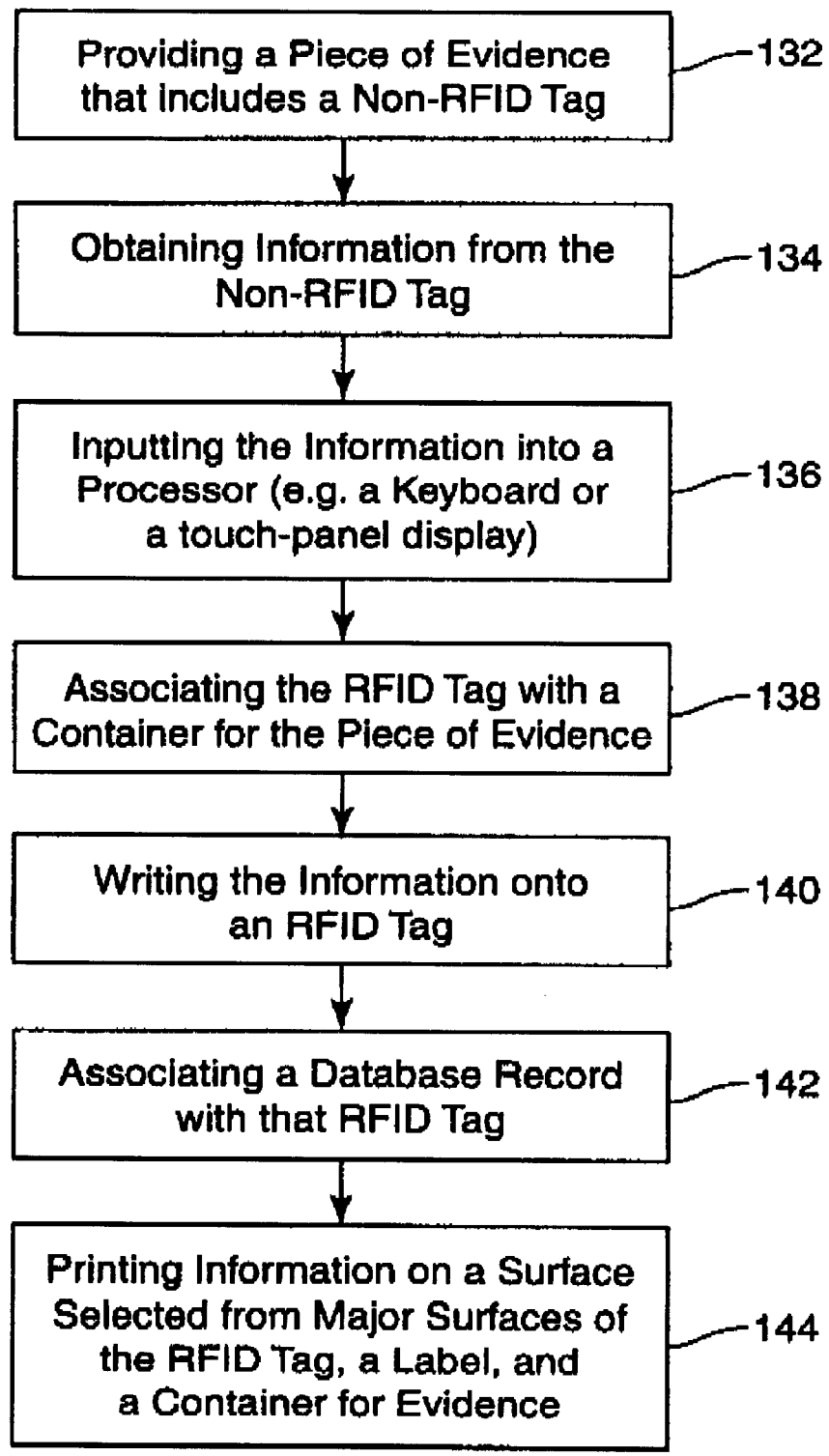
FIG. 2 illustrates one preferred method for convening a collection of non-RFID tagged pieces of evidence to RFID-tagged evidence.

In one embodiment, the method includes the steps of selecting a piece of evidence that bears a non-RFID tag, obtaining information from that tag (for example visually, if the information is simply printed on the tag, or by scanning if the information is provided in bar-code or machine-readable format), inputting the information into a processor (for example, by a keyboard or a touch-panel display), convening the information into a format that can be stored on an RFID tag, programming or "writing" the information to an RFID tag, and creating or editing a database record associated with that RFID tag. As shown in FIG. 1, the conversion station 100 used to convert the existing evidence collection can thus include or be operatively connected to an input subsystem 105 (such as a keyboard, touch panel, bar-code scanner, or the like), a processor 125 that receives and processes the information, a database 115 in which records can be created, edited, or deleted, an RFID writer, and an RFID tag processing system that can obtain a tag (perhaps from a roll 120 of such tags), position it near an antenna 110 for the RFID writer so that information can be written to the tag, and then advance it to a position where it can be removed by the user and applied to the evidence or container. One preferred method 130 for converting a collection of non-RFID) tagged pieces of evidence to RFID-tagged evidence is illustrated in FIG. 2 in the form of a flow chart diagram. Method 130 includes step 132 of providing a piece of evidence that includes a non-RFID tag. Method 120 also includes step 134 of obtaining information from the non-RFID tag. Method 130 also includes step 136 of inputting the information Into a processor (e.g. a keyboard or touch-panel display). However, the information may be inputted into a processor other than a keyboard or touch-panel display. Method 130 also include step 138 of associating the RFID tag with a container for the piece of evidence, However, the RFID tag may be associated with the piece of evidence directly without the use of a container. Method 130 also includes stop 140 of writing the information onto an RFID tag. Method 130 also includes step 142 of associating a database record with that RFID tag. Method 130 also includes the alternative step 144 of printing information on a surface selected from major surfaces of the RFID tag, a label and a container for the evidence.

Other useful aspects of the conversion station and method, and of the invention generally, may include the following. The RFID tag may be placed in an envelope, bag, or other container either when the container is made (which may be referred to as "source marking" the container), or subsequently either by the eventual user or someone else. A closeable, tamper-evident bag of this type is disclosed in U.S. Pat. No. 5,635,917 (Todman). Thus, the RFID tag programmed by the conversion station (or used by another user as described below) can already be associated with a container into which the evidence can be inserted. Another optional feature is to provide a printer for the conversion station, so that information can be printed on any suitable surface of the RFID tag, or a label that includes the RFID tag, or the container. That information could be in the form of a bar code, alphanumeric symbols, or other printed indicia, and may be useful when files are provided with RFID tags, for example. It may also be useful to enter information onto a database record that is associated with the RFID tag and the evidence, so that that information may be searched or otherwise used subsequently.

B. Evidence Collection. Another aspect of the present invention is the collection and tagging of evidence using RFID technology. Law enforcement officials may collect evidence and put it into a container (which may be a sealable, tamper-evident container) provided with an RFID tag, such as the one disclosed in U.S. Pat. No. 5,635,917 (Todman). The tag may be programmed to include one or more pieces of information, examples of which are described below, or those pieces of information may be provided in a database. If, for example, the information is provided in a database, then the tag may be interrogated to obtain enough information from the tag to enable the corresponding database entry to be identified and the desired information thereby obtained. Information to be stored on the tag or the database could include one or more of the following types of information:

(1) a case identification number;
(2) the crime type;
(3) a victim's name;
(4) a suspect's name;
(5) the location where the evidence was obtained;
(6) the name of the person who collected the evidence;
(7) the name of the agency handling the investigation;
(8) the name of the person who owns the property;
(9) the names of the persons who have been in possession of the evidence;
(10) a description of the information;
(11) the date of the offense;
(12) the date that the evidence was collected;
(13) the date that the property can be returned to the owner, or destroyed;

(14) the status of the evidence (for example, active, inactive, scheduled to be discarded); and/or

(15) any test results obtained in regard to the evidence.

Evidence collection when done in this manner initiates the chain of custody using RFID technology.

C. Tagging of Evidence. Evidence may be tagged in the following manner. An RFID tag may be provided that has a unique identifier, such as a tag identification number or alphanumeric string, already stored in memory. The user can obtain the tag, apply it to the evidence, and then create or modify an entry in a database that associates that specific tag with the evidence. The unique tag identifier assures that it is impossible that two tags in the same location would have the same tag identifier. The tag identifier can be obtained from the tag either by interrogating the tag with an RFID reader, or by reading it visually if the information is printed on the tag, for example. Information of the kind enumerated above may then be entered into the database, or stored on the tag, or both, to facilitate later use of that information. This tagging system is useful because, among other reasons, the tag does not have to be programmed by the user with additional information identifying either the tag or the evidence, which can conserve space in the memory of the tag available to the user.

Another way to tag evidence is to locate information in a database related to a particular piece or class of evidence, select information that is also applicable to the additional evidence to be stored, and program (write) the selected information to the tag. For example, the fiftieth piece of evidence in a case may be tagged by locating the electronic records associated with one or more of the previous pieces of evidence in that case, identifying certain information from those records to be provided on the RFID tag for the fiftieth piece of evidence, and then writing that information to an RFID tag to be associated with the fiftieth piece of evidence. The fiftieth piece of evidence may have certain information in common with one or more of the previous pieces of evidence, including the name of a suspect, the name of a victim, the date of the crime, and other information of the type listed above. Additional information may also be written to that tag, to provide information specific to that piece of evidence.

D. Storage of Evidence. Some evidence, such as blood, can degrade over time, and must be preserved under controlled conditions. Another aspect of the present invention is the use of RFID technology to tag and monitor such evidence. In that respect, evidence may be provided with an RFID tag as generally described herein, and placed in a climate-controlled environment such as a refrigerated area, a dry area, a warm area, or the like. For example, a blood sample may be contained in a bag, and the bag (and RFID tag) stored in a refrigerator having a temperature maintained at 4.4 degrees C. (40 degrees F.). A climate monitoring system (such as a thermometer, a hygrometer to measure humidity, an optical sensor to measure the presence of light) is provided in the environment, and can in coordination with a processor determine when the climate is within and outside of certain acceptable climatic ranges.

The climate-controlled environment may have one or more RFID readers and RFID writers that can communicate with the RFID tags. The RFID writer(s) (or the RFID writer portion of a combination RFID reader/writer) can program more than one RFID tag substantially simultaneously with information (which may be made unalterable) if the climate monitoring system indicates that the climate has varied from certain predetermined conditions. For example, if the temperature in the refrigerator drops below 0 degrees C. (32 degrees F.), then the RFID writer can write a message to RFID tags indicating that condition. Similarly, if other environmental conditions vary outside of certain predetermined limits (excessive or insufficient temperature, humidity, or light, for example), those conditions can be indicated on the RFID tags. If that information is stored on the RFID tags in a manner that is very difficult or impossible to alter, then the absence of that information could be useful to law enforcement authorities subsequently, or conversely the presence of that information could be useful to potential defendants. This system has the added benefit that the RFID tags should be much less expensive than environmental monitoring tags that actually monitor environmental conditions themselves and provide a record of those conditions. In another embodiment, information concerning the environmental conditions could be stored in a database record that is correlated to each specific RFID tag, instead of or in addition to information that is stored on the RFID tag itself. This could have the added benefit of tracking the environmental conditions for a given piece of evidence over time, because it may be easier to store additional pieces of information in a database than on the limited memory available on current RFID tags. In other embodiments, a user may program information to the RFID tags on demand, or the system may be adapted to program information to the RFID tags at predetermined times, or intervals of time.

E. Searching for Evidence. Current evidence storage facilities may require a user to manually sort through existing pieces of randomly stored evidence to locate the piece of evidence of interest. This is time consuming, and may even damage or cause the loss of other evidence. With the use of RFID technology, RFID-tagged evidence can be searched more efficiently, either by a handheld RFID reader, or by a permanent RFID reader located in, on, or near the storage locations. Readers and reader systems of the type disclosed in PCT Publication WO 00/10122(Garber et al.), WO 00/10144(Garber et al.), and WO 00/10112(Goff et al.) may be useful in that regard. This searching system eliminates the need for line-of-sight inspection, which is normally required for both visual inspection of evidence and bar-code scanning of bar-code tagged evidence. It also minimizes problems due to unreadable, removed, or lost tags of the kind currently in use, and eliminates the need to create a new tag each time information is updated, because the tag memory can be selectively overwritten.

To search for evidence, a user may input information to an RFID reader describing the desired piece of evidence other than by RFID interrogation, and then use the RFID reader to interrogate the RFID-tagged items within the range of the reader. For example, the user may enter a case identification number into a reader through some kind of user interface (such as a keyboard, touch-panel display, or the like) or connection (such as a serial port to connect with a processor and database), and then have the RFID reader interrogate all the evidence within its range to locate RFID tagged items related to that case. Alternatively, if other information is stored on each RFID tag or in a database entry (such as the kinds of information enumerated above), then evidence having RFID tags that include that information can also be located. RFID tags that correspond to the description entered into the RFID reader can then be identified and located, and thus the corresponding piece(s) of evidence located. For example, if a disposal date is stored on an RFID tag, then a user can search for all evidence having a disposal date prior to the day of the search. Such evidence may then be removed from the evidence storage area, and perhaps destroyed in keeping with any applicable retention guidelines. Specific evidence (either among the other evidence collected for that case, or among some other group of pieces of evidence) may be located using RFID tags and interrogators, so that a person searching for, say, a bloody glove can input information related to that evidence (such as "item number 4," or "Officer XXXX," or "date before Jan. 1, 2001") into the RFID reader and enable it to search for RFID-tagged pieces of evidence corresponding to the information provided to the reader. The information for which the RFID reader is searching may be located on the RFID tag itself, or in a database record associated with the RFID tag. A benefit to having the searched information on the RFID tag itself is that the RFID reader may locate and indicate the presence of the RFID-tagged piece of evidence in real time, without having to resort to a database on the reader or accessible to it by wireless or other connection.

Another useful searching system is to call up on a reader a list of evidence from a particular case, and then to select from that list one or more pieces of evidence for which a search should be conducted. The list of evidence from the particular case may be obtained either from the memory of the RFID reader, or from a database linked to the RFID reader (either by cable, or by wireless connection, for example). The user interface of the RFID reader may permit the user to highlight, check off, or otherwise indicate which pieces of evidence or which class of evidence the user wishes to search for, and the reader would then interrogate RFID tags until it located one or more tags associated with the items of interest.

In another embodiment, an algorithm can be input into the RFID reader that describes an ordered set of evidence, and then a plurality of pieces of evidence can be interrogated to determine whether the interrogated pieces of evidence are in the algorithm order. Examples of suitable algorithm orders could be ones based on case identifiers, or on chronological (including reverse-chronological) order.

Another feature of the searching method is to associate a piece of evidence with a location. The RFID tag associated with a piece of evidence may be interrogated, information may be provided describing a location, and then the two may be associated with each other in a database. The location could be a crime scene, or a room or part of an evidence storage location, in which case a separate RFID location tag may be interrogated to obtain the information describing the location.

Another searching method is to interrogate an RFID tag associated with a piece of evidence, to interrogate an RFID tag associated with at least one additional piece of evidence within a group of pieces of evidence, and to determine whether the piece of evidence is associated with the group of pieces of evidence. This may be useful, for example, in determining whether a misplaced piece of evidence belongs with the evidence near where it was found. As with other embodiments of the invention, an indication of whether or not the piece of evidence belongs with the group can be provided to a user.

To locate several pieces of evidence within a group, an RFID reader may be provided with information identifying the pieces of evidence, and then an area or location believed to contain the pieces of evidence can be interrogated. The reader can provide an indication when it interrogates the RFID tags associated with the pieces of evidence in the group, and can provide an indication of the number of such pieces that have been interrogated. This may be useful for locating all of the pieces of evidence related to a single case, for example, or for confirming the inventory of pieces of evidence in a particular bin, shelf, or the like. An indication of how many pieces of evidence were not located can also be provided, as with other embodiments of the present invention, either through a user interface on the RFID reader or otherwise. This inventory function may enable a user to conduct a periodic audit, and can indicate not only pieces of evidence that were expected to be at the location but were not, but also pieces of evidence that were not expected to be at the location but were. By positioning multiple interrogating antennae at locations throughout an area of interest, and optionally by multiplexing interrogation signals to each of the antennae successively, a complete inventory may be conducted in far less time than has heretofore been possible.

F. Chain of Custody. Another aspect of the present invention is its use in tracking the chain of custody of a piece of evidence. An RFID-tagged piece of evidence can be programmed by an RFID writer to include information that identifies each person to have possession of the evidence. The programming may be done manually (by a person entering his or her information into an RFID device), or automatically (by using, for example, an RFID antenna surrounding a portal such as a doorway or pass-through window to match an RFID badge on a person with an RFID tag on a piece of evidence). The portals associated with an interrogator and antenna may also be, for example, entries to rooms or areas within a larger room, such as a secure room for holding firearms or drugs that may be segregated from the remainder of an evidence storage area. The tag or the database or both, when receiving information describing a person who currently possesses the evidence, can check its or their memory to determine whether that person is different from the last person shown to have had possession of the evidence, and if so, the memory or database of either or both can be appropriately updated. In another embodiment, a person can register or otherwise be authorized, obtain an item of evidence, walk through a portal, and have the associated portal reader verify that the person (who has an RFID identification tag of some type) is authorized to obtain evidence, or to obtain that specific piece of evidence. The information matching a person to the piece of evidence can be stored on the RFID tag, on a database entry associated with that RFID tag, or on both. If the information is stored on the RFID tag, then it may be useful if that information cannot be altered once it has been written (using write once, read many ("WORM") memory on the tag). A predetermined list of people who are authorized to possess evidence may be maintained in a database, and RFID readers that detect RFID-tagged evidence in proximity to an RFID-badged but unauthorized person may send a notification signal to an appropriate person or location.

G. Location Transfer. It may also be useful to track the location of a piece of evidence. That may be done in one of several manners. For example, portal readers of the type described above may be used to obtain information from RFID-tagged evidence as it is moved, and can update the tag, a database, or both as to the new location of the tagged evidence. This information may also be obtained by other readers, including handheld readers and non-portal readers, such as those associated with the storage locations themselves. PCT Publication WO 00/10112(Goff et al.) describes, in one embodiment, a shelf-tape-style reader system that could be used in this manner, to periodically poll all the tags in a specified location and to update a database, for example, of the tags found at those locations.

It may also be useful to associate an RFID reader or a combination reader/writer with certain locations or equipment, so that each time that a certain location or piece of equipment is used in regard to a piece of evidence, that information is recorded. For example, if a gun is tagged and then tested in a firearms laboratory, an RFID writer associated with that equipment could program the RFID tag (or update a database record) to indicate, for example, information concerning the date, time, and location of the firearms test, the person(s) conducting the test, test results, and other similar information related to the test. This could also be done for other laboratory or other tests, such as biological (such as blood or DNA) testing, and the like. The person(s) conducting the test could be identified by RFID interrogation of a badge or the like, as with the interrogation described with reference to portals for chain of custody purposes.

H. Transfers of Evidence Collections. Evidence may be collected and maintained by a first law enforcement authority, and subsequently transferred to a second law enforcement authority for further prosecution of the lawsuit or matter. For example, a state or local law enforcement authority may collect certain evidence believed to be relevant to a state crime, such as murder, and later determine that the crime is a federal crime, such as kidnapping or racketeering. In those and other situations, the evidence collection may be transferred from one law enforcement agency to another. The present invention simplifies such transfers by enabling the first law enforcement authority to search for evidence related to a specific case in the manners described above, download the database or database entries related to that case onto a portable data storage medium, such as a computer floppy disc, CD, or DVD, and transfer the data storage medium along with the evidence to the second law enforcement authority. Alternatively, the database or database entries may be transmitted between the computers of the two authorities, either by network, the Internet, or another suitable means of transmission. The second law enforcement authority may then choose to load the database on its computer system, use an RFID reader to interrogate the transferred evidence collection, and confirm that all the evidence has been appropriately transferred. If for some reason it is useful to transfer the data storage medium alone, for example to another law enforcement agency or court, then that could be done also. It may also be desirable to create duplicate copies of the database, to enable the transferring location to retain a record of the evidence transferred.

We claim:

1. A method for converting a collection of non-RFID tagged pieces of evidence related to law enforcement to RFID-tagged evidence related to law enforcement, comprising the steps of:
   (a) providing a piece of evidence related to law enforcement that includes a non-RFID tag;
   (b) obtaining information From the non-RFID tag;
   (c) inputting the information into a processor;
   (d) writing the information onto an RFID tag;
   (e) associating a database record with that RFID tag; and
   (f) associating the RFID tag with the piece of evidence related to law enforcement.

2. The method of claim 1, wherein steps (b) and (c) comprise scanning a bar code on the non-RFID tag.

3. The method of claim 1, wherein step (b) comprises reading information from the non-RFID tag visually.

4. The method of claim 1, wherein step (c) comprises typing information using a keyboard.

5. The method of claim 1, wherein step (c) comprises using a touch-panel display.

6. The method of claim 1, wherein the method further includes the step of associating the RFID tag with a container for the piece of evidence prior to step (d).

7. The method of claim 1, wherein the method further includes the step of printing information on a surface selected from major surfaces of the RFID tag, a label, and a container for the evidence.

8. The method of claim 1, wherein the method further includes the step of entering information that relates to the piece of evidence into the database record.

9. A method for converting a collection of non-RFID tagged pieces of evidence related to law enforcement to RFID-tagged evidence related to law enforcement, comprising the steps of:
   (a) providing a piece of evidence related to law enforcement that includes a non-RFID tag, followed by the step of
   (b) obtaining information from the non-RFID tag, followed by the step of
   (c) inputting the information into a processor; followed by the following steps in any order:
      (i) writing the information onto an RFID tag; and
      (ii) associating a database record with that RFID tag; and
   (d) associating the RFID tag with the piece of evidence related to law enforcement.

10. A method for converting a collection of non-RFID tagged pieces of evidence related to law enforcement to RFID-tagged evidence related to law enforcement, comprising the steps of:
   (a) providing a piece of evidence related to law enforcement that includes a non-RFID tag, followed by the step of
   (b) obtaining information from the non-RFID tag, followed by the step of
   (c) inputting the information into a processor; followed by the following steps in any order;
      (i) writing the information onto an RFID tag;
      (ii) associating a database record with that RFID tag; and
      (iii) entering information that relates to the piece of evidence related to law enforcement into the database record; and
   (d) associating the RFID tag with the piece of evidence related to law enforcement.

11. A conversion station for converting a collection of non-RFID tagged pieces of evidence related to RFID-tagged pieces of evidence related to law enforcement comprising:
   (a) an information receiving system into which information related to a piece of evidence related to law enforcement may be input;
   (b) an RFID tag feeding mechanism to receive and advance RFID tags to a tag programming zone; and
   (c) an RFID writer including an antenna adjacent the tag programming zone, for writing the information to the RFID tag positioned in the tag programming zone.

12. The conversion station of claim 11, wherein the conversion station further includes a supply of RFID tags positioned within the RFID tag feeding mechanism.

13. The conversion station of claim 12, wherein the conversion station further includes a processor and a database, and the processor associates the RFID tag with a database record.

14. The conversion station of claim 11, wherein the database record includes information about the piece of evidence.

* * * * *

UNITED STATES PATENT AND TRADEMARK OFFICE
CERTIFICATE OF CORRECTION

PATENT NO. : 6,816,075 B2
DATED : November 9, 2004
INVENTOR(S) : Grunes, Mitchell B.

It is certified that error appears in the above-identified patent and that said Letters Patent is hereby corrected as shown below:

Title page,
Item [56], References Cited, OTHER PUBLICATIONS, "Herdeen, Frederick et al.," reference, after "et al." delete "," and insert -- ;--.

Column 1,
Line 53, after "shelf" insert -- . --.

Column 3,
Line 46, delete "convening" and insert -- converting --.

Column 4,
Line 1, delete "Into" and insert -- into --.
Line 5, after "evidence" delete "," and insert -- . --.
Line 8, delete "stop" and insert -- step --.
Line 13, after "label" insert -- , --.

Column 9,
Line 51, delete "From" and insert -- from --.

Column 10,
Line 36, after "order" delete ";" and insert -- : --.
Line 46, after "related to" insert -- law enforcement to --.
Line 47, after "enforcement" insert -- , --.

Signed and Sealed this

First Day of March, 2005

JON W. DUDAS
*Director of the United States Patent and Trademark Office*